United States Patent
Bricker et al.

[15] 3,656,854
[45] Apr. 18, 1972

[54] GLASS DEFECT DETECTION SYSTEM

[72] Inventors: Jack A. Bricker, Tarentum; Hugh E. Shaw, Jr., New Kensington, both of Pa.

[73] Assignee: PPG Industries Inc., Pittsburgh, Pa.

[22] Filed: June 11, 1969

[21] Appl. No.: 832,050

[52] U.S. Cl. .................................356/119, 65/29, 65/158, 65/160, 250/219 DF, 356/72, 356/201, 356/239
[51] Int. Cl. .......................................................G01n 21/40
[58] Field of Search ................65/29, 158, 160; 250/219 DF; 356/239, 72, 201

[56] References Cited

UNITED STATES PATENTS

| | | | |
|---|---|---|---|
| 3,166,627 | 1/1965 | Shaw, Jr. | 356/239 |
| 3,202,043 | 8/1965 | Galey et al. | 356/239 |
| 3,533,706 | 10/1970 | Maltby, Jr. et al. | 356/239 |

*Primary Examiner*—Arthur D. Kellogg
*Attorney*—Chisholm and Spencer

[57] ABSTRACT

A glass-defect detection system comprising a light source, a stationary disc, a scanning disc and a photomultiplier. A light beam is transmitted from the light source through the piece of glass being tested. The scanning disc is rotated by a motor so that slots on the scanning disc are aligned with slots on the stationary disc to form an aperture. When there are no defects in the glass, light from the light source misses the aperture and no light reaches the photomultiplier. When there is a defect in the glass, the light is distorted within the glass so that a light beam passes through the aperture and to the photomultiplier. The greater the defect, the greater the amount of light that reaches the photomultiplier. In another embodiment, stress concentrations in the glass are detected by an apparatus including a light source that projects light toward two polarizers (one on either side of the glass), a scanning aperture (similar to the one mentioned above) and a separate photomultiplier. Light directed toward the polarizers is normally prevented from reaching the photomultiplier because the two polarizers are oriented about 90° to one another. When a stone with associated stress concentrations is present in the glass, light is transmitted through the polarizers to the scanning aperture and the photomultiplier receives a pulse of light.

7 Claims, 5 Drawing Figures

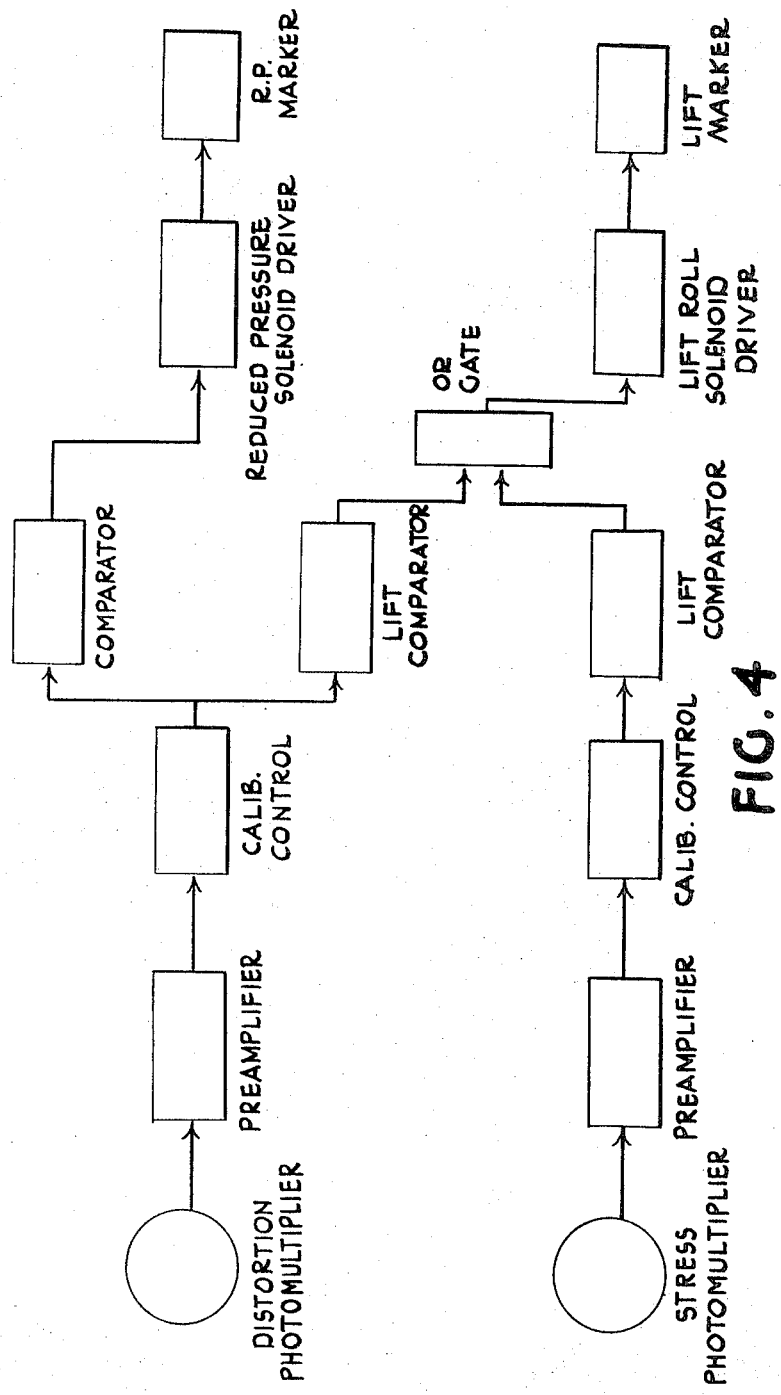

GLASS DEFECT DETECTION SYSTEM

BACKGROUND OF THE INVENTION

1. Field of the Invention

In a method of making glass known as a float process, molten glass is floated onto a fluid bed of molten tin. Glass produced by this method has defects as in any other production process. Among the variety of defects produced in the processing of float glass is a family of defects known as stress producing stones which can and do cause breakage in subsequent operations such as the undercleaning of the bottom or tin contacted surface of the glass. In certain cases, stress producing stones entering the undercleaning machine without the proper preventative action will result in breakage of the continuous glass ribbon and damage to the undercleaning equipment.

The present invention is a method and apparatus for detecting the family of stone-type defects. The apparatus includes a fixed disc and a rotating disc, each having at least one slot. As the rotating disc turns, slots on one disc align with slots on the other disc to form at least one aperture. The location of this aperture changes as the rotating disc turns so that it scans across the glass ribbon.

2. Description of the Prior Art

Presently the stress producing family of stones are detected by trained inspectors who scan the moving ribbon of glass and attempt to locate and mark obvious defects. This manual scanning and inspecting technique is not fast enough for the present production of continuous ribbons of glass, especially ribbons which are produced at a much higher rate of speed than the prior art plate glass forming machines.

SUMMARY

This invention includes a light system which scans the glass in successive small segments by the scanning device. Light beams are directed upon a photosensitive device when there are optical defects in the glass ribbon. An associated system produces an electrical output signal proportional to the light intensity.

The presence of defects also causes changes in stress within the glass. A change in the polarization of the scanning light is detected by a detection device. This produces an output signal which is correlated with the actual stresses produced within the glass by the defects.

In the drawings:

FIG. 2A is a plan view of the analyzer of FIG. 2.

FIG. 4 is a block diagram showing the operation of the detection devices and associated controls and detecting electrical circuits.

PREFERRED EMBODIMENT

Figure 1:
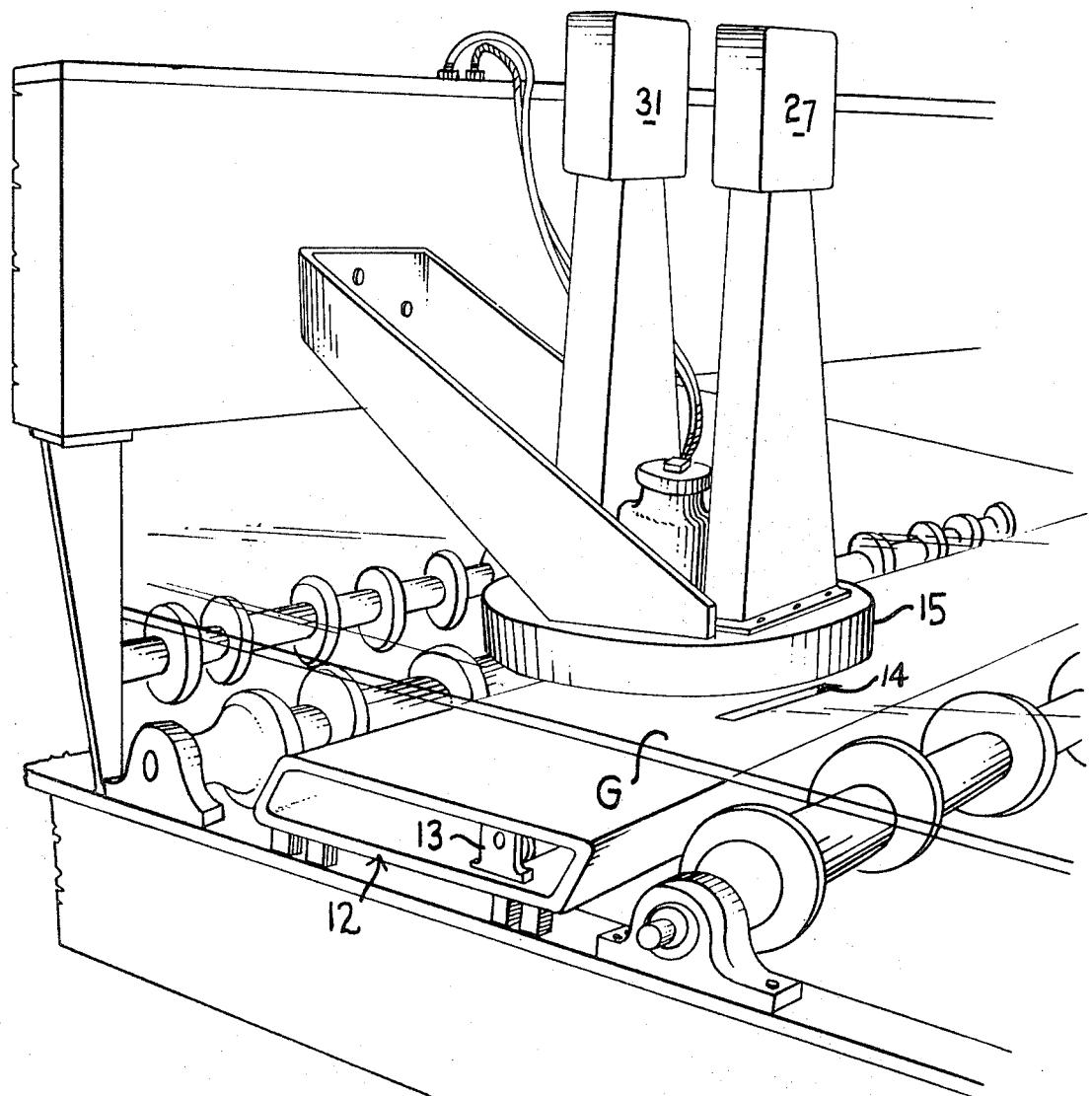
FIG. 1 illustrates a perspective view of scanning devices positioned over a continuously moving ribbon of glass.
Figure 2:
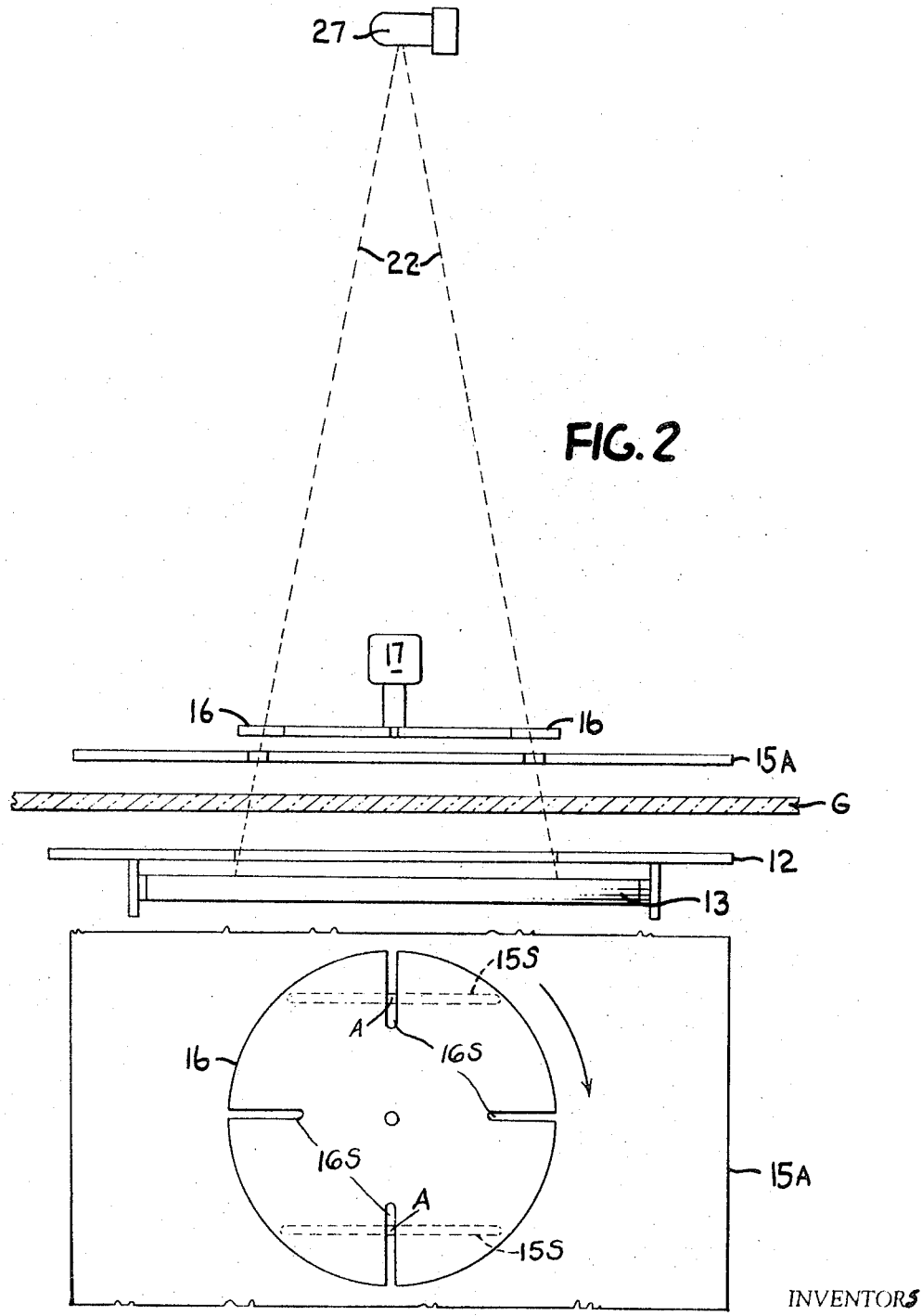
FIG. 2 is a schematic view of the distortion analyzer of FIG. 1.

The detection apparatus has a suitable base 12 with means for mounting a source of light 13, such as a fluorescent lamp. The base has a pair of spaced parallel slots, one of which is indicated by 14 in FIGS. 1 and 2. These slots extend across the ribbon of glass in a direction transverse to the glass travel. Mounted above the moving ribbon of glass G is a scanning assembly 15 having an fixed disc 15A. A scanning disc 16 is mounted above the fixed disc 15A on a central shaft and connected to a motor 17 which rotates disc 16. A detection device 27 is mounted at the focal intersection of light rays 22. Fixed disc 15A has two parallel slots 15S, which extend in a direction that is transverse to the movement of the glass ribbon G. Rotary disc 16 is shown as having 4 slots 16S, each of which extend in a radial direction. Slots 16S on disc 16 are aligned with slots 15S on disc 15A to form scanning apertures A. These apertures permit light to be transmitted from light source 13 through the ribbon of glass G in a direction toward a detection device 27. Slots 15S and 16S are designed so that light rays 22 originating from the light source 13 miss aperture A unless there is some distortion in glass G beneath aperture A. This is more clearly illustrated in a side view, such as FIG. 3. Each scanning assembly covers for example, about 6 inches of ribbon width. The scanning width of each unit is limited by the length of the slots 15S and 16S. FIG. 2 is a view of the distortion anaylzer with the glass G traveling in a direction toward the viewer (out of the paper). It illustrates two fixed parallel slots 15S scanned by two slots 16S in the scanning disc to form two scanning apertures A. As the scanning disc 16 is rotated by the motor 17, the combined effect of the fixed slits and moving slits forms apertures or windows which travel across the 6 inches of glass width.

Figure 3:
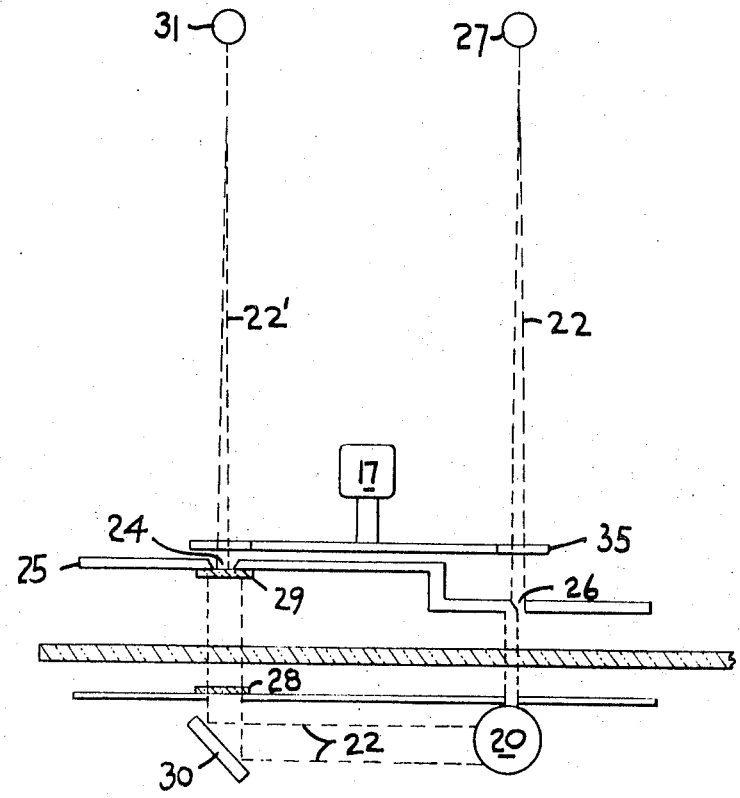
FIG. 3 is a schematic showing of the operation of both a stress analyzer and a distortion analyzer in a single scanning device.

Referring to FIG. 3, there is shown a side view of an apparatus including a distortion analyzer (similar to the one heretofore described) and a stress analyzer in one scanning device. A common light source 20 can be utilized. Under normal conditions, i.e., no unusual stresses within the glass, light rays are prevented from reaching a photosensitive device such as a stress photomultiplier 31 because of polarized lenses 28 on 29 which lenses are oriented at angles of 90° to one another. Light rays from light source 20 are deflected off of mirror 30 towards polarizers, such as polarized lenses 28 and 29. Since the polarized lenses are 90° out of phase, no light passes through both of these lenses to the stress photomultiplier 31. However, when a stone with its associated glass stress is passed between the polarized lenses 28 and 29, the stress in the glass causes light rays 22 to be transmitted to the stress multiplier 31 as a brief pulse of light, producing an electrical output signal which is proportional to the light passed, i.e., the stress in the glass. The greater the stress change caused in the glass by the stone the greater the output signal. This system produces an output directly proportional to the actual stresses in the glass. In the distortion analyzer, light source 20 is positioned so that light rays 22 that travel straight through the glass, are blocked by discs 15A and 16, and miss aperture 26 under circumstances where there is no distortion within the glass. However, when a piece of glass containing a "stone" which has the optical distortion capabilities associated with a "distortion" stone type passes through the system, the light 22 is refracted into the scanning aperture where it is scanned or passed on through the distortion channel photosensitive device. In this portion of the system, the electrical output signal provides a direct correlating indication of stress that the stone will develop under the pressure that will be subsequently induced in the glass in the undercleaning operation.

FIG. 4 shows the operation circuit. In FIG. 4 the output of a distortion photomultiplier is fed into a preamplifier and a calibration control. The outputs are then fed into a reduced pressure comparator and a lift comparator controlling a pressure solenoid on the undercleaner of the glass. The pressure solenoid reduces the undercleaner pressure on the glass. The output of the stress photomultiplier is fed to a preamplifier and a calibration control and then to the lift comparator, and then signal of the distortion photomultiplier and the stress photomultiplier are fed into an operating gate circuit which controls the solenoid driver of a lift roll and hence the action of a marking device which is contacted to the glass in response to outputs of the distortion or stress photomultiplier.

The family of stress producing stones which cause trouble in the undercleaner machine are usually made up of at least two types. Both types are characterized by the fact that they act as stress concentrators when subjected to the subsequent mechanical pressures applied to the glass sheet by the undercleaning machine. In the first family type of almost any size, the stone is usually confined within the body of the glass and causes the immediately surrounding glass area to be permanently stressed. This produces a residual stress making it detectable by the use of the polarized light beams as described above.

The second family type, which is usually larger by comparison to the first, protrudes above the surface of the glass and causes the immediately surrounding surface area to be optically distorted. This family of defects can be detected by the distortion it causes in the reflected or refracted light rays as intercepted in the immediate vicinity of the defect. It is necessary that the two types of detection and measurement systems be used, however, in the interest of the efficiency and simplified operation, this invention has combined these systems into one scanning unit in which common components can be utilized by both systems. A plurality of units spaced across the width of the ribbon will scan a complete area of the ribbon. This apparatus eliminates the need for a human inspector stationed ahead of the undercleaning machine and has decreased cost and greatly increased efficiency in the operation of the detectors. This device will detect, mark, and take appropriate relief action before the defects reach the undercleaner rolls.

We claim:

1. An apparatus for detecting the stress and distortion defects in a glass sheet caused by the presence of stones in the sheet, and for producing electrical signals corresponding to such defects comprising:

means for projecting first and second beams of light through said glass sheet;

a first detector means for receiving said first beam of light after it passes through said glass sheet;

first blocking means including a first aperture disposed adjacent a surface of said glass sheet and positioned in the path of said first beam so as to prevent said first beam from reaching said first detector means when said first beam passes through glass that is distortion free, said detector being so located that light in said beam that is bent by distortion in said glass sheet will pass said blocking means and fall on said detector means, the intensity of the light reaching said detector means being a measure of the distortion in said glass sheet;

first means for polarizing said second beam of light before it is projected through said sheet of glass;

a second detector means for receiving said second beam of light after it passes through said glass sheet;

second blocking means including a second aperture disposed adjacent a surface of said glass sheet and in the path of said second beam of light after it has passed through said sheet of glass, and a second light polarizing means at said second aperture, said second polarizing means being so oriented with respect to said first polarizing means as to prevent said second beam from reaching said second detector means when said second beam passes through glass that is stress free, and to permit light that is polarized by stress in said glass to pass through said second polarizing means to said second detector means, the intensity of the light falling on said second detector means being a measure of the stress in said glass;

scanning means interposed between said first and second apertures and the respective first and second detector means, whereby any light falling on said detector means is periodically interrupted so that the outputs of said first and second detector means are in the form of electrical output pulses proportional to the measured distortion and stress, respectively; and means responsive to electrical output pulses from either of said detector means for protecting said sheet of glass from breakage caused by glass handling equipment by relieving the pressure of such equipment against said sheet at defect locations.

2. The apparatus of claim 1, wherein said scanning means comprises a rotatable scanning disc having at least one aperture, and means for rotating said disc so that said scanning disc aperture is periodically aligned with each of said first and second apertures to form openings through which said first and second light beams can pass when a defect is being detected.

3. The apparatus of claim 2, wherein said first and second apertures are in the form of spaced slots, said disc being located between said slots whereby said disc aperture scans said first and second slots alternately.

4. The apparatus of claim 1, wherein said means responsive to said electrical output pulses comprises circuit means for actuating a pressure solenoid on glass sheet undercleaner equipment to thereby reduce the pressure of such equipment on areas of the glass where stone defects are detected by said detector means.

5. The apparatus of claim 4, wherein said means responsive to said electrical output pulses further comprises circuit means for actuating a lift roll solenoid on said glass sheet undercleaner equipment.

6. The apparatus of claim 5, wherein said means responsive to said electrical output pulses further comprises circuit means for actuating marking devices for marking on said glass sheet the location of detected defects.

7. The apparatus of claim 1, wherein said means responsive to said electrical output pulses comprises circuit means for actuating marking devices for marking on said glass sheet the location of detected defects.

* * * * *